June 30, 1953 B. A. GRAHAM ET AL 2,643,864
FOOD MIXER
Filed Jan. 31, 1951 4 Sheets-Sheet 1

INVENTORS
BERNARD A. GRAHAM
& IVAR JEPSON
BY McKenna & Morelock
ATT'YS.

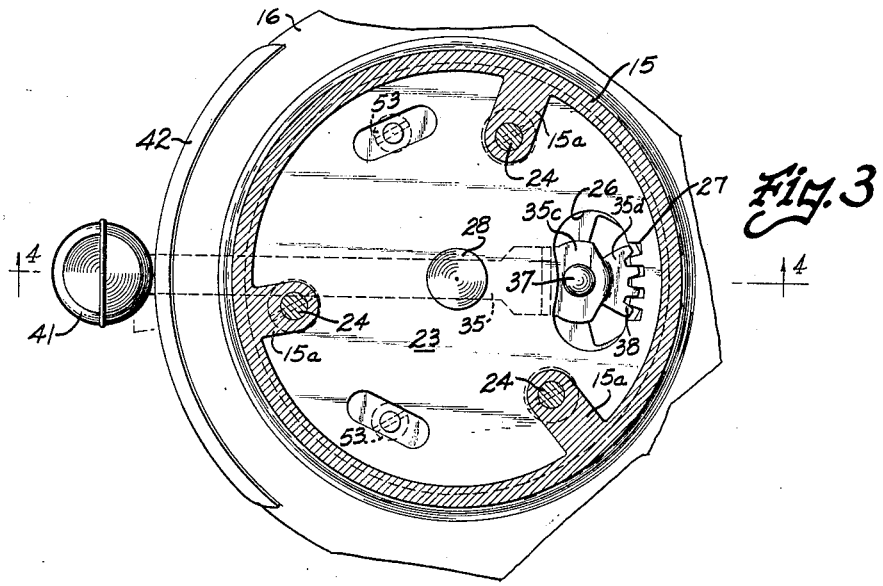
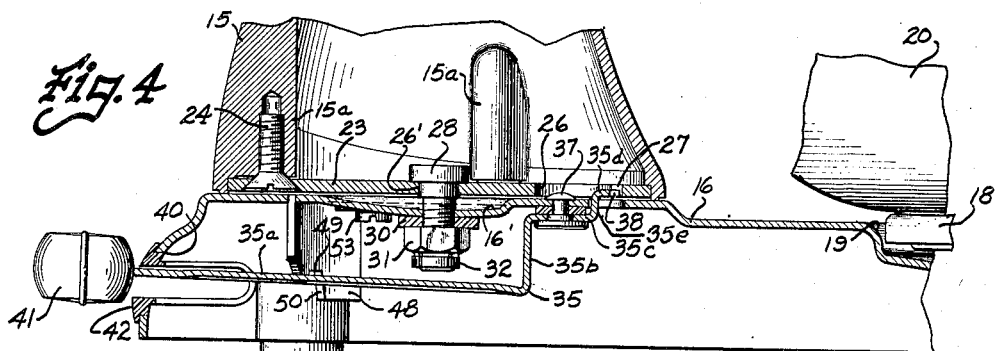
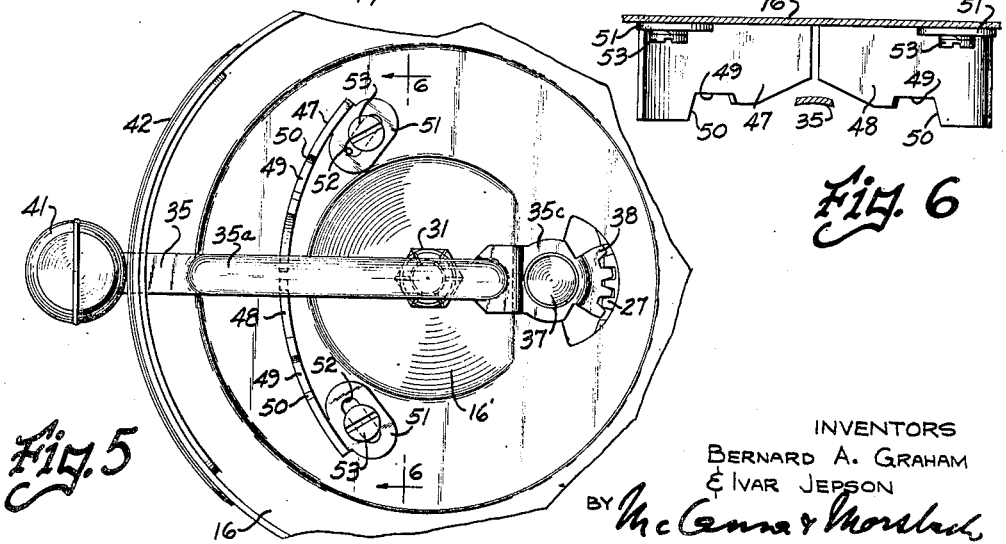

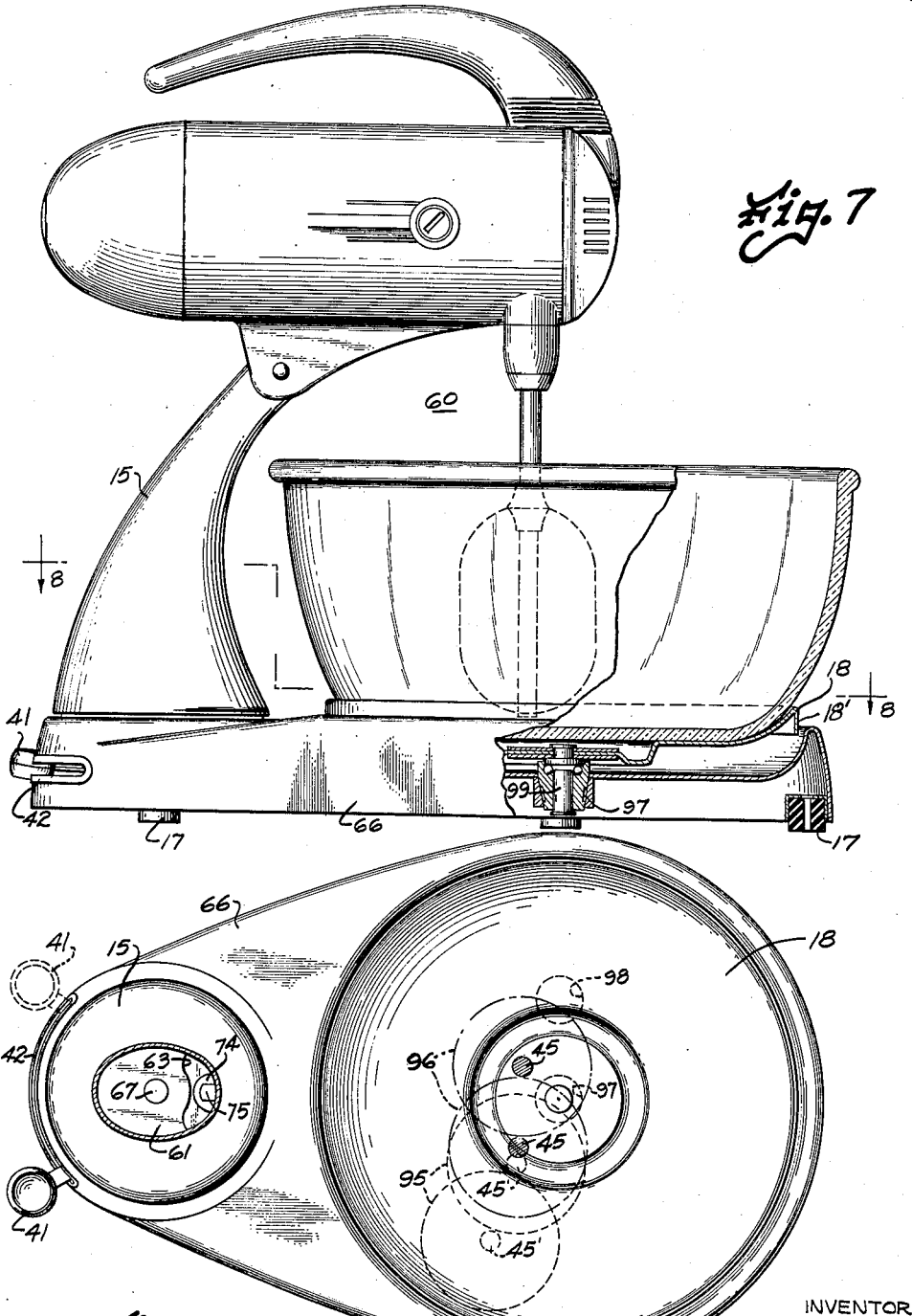

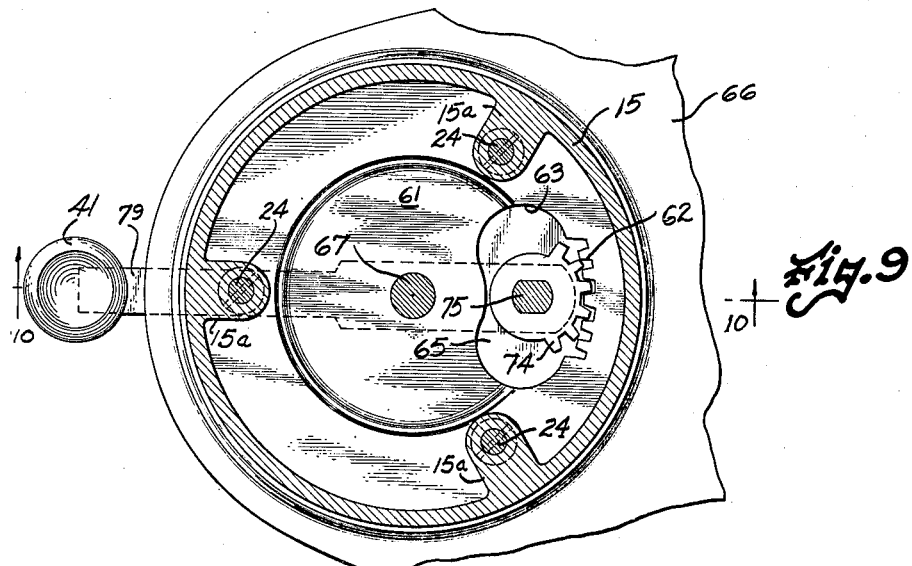
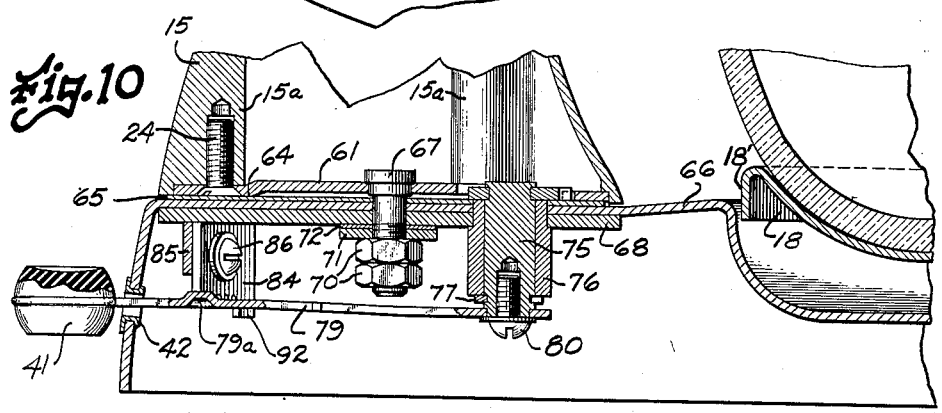
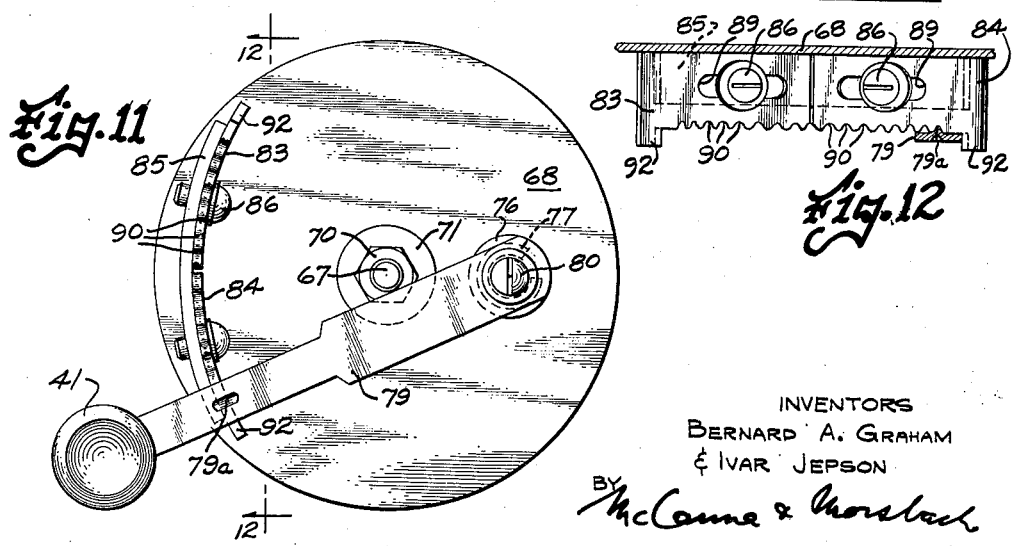
INVENTORS
BERNARD A. GRAHAM
& IVAR JEPSON

Patented June 30, 1953

2,643,864

UNITED STATES PATENT OFFICE 2,643,864

FOOD MIXER

Bernard Alton Graham, Chicago, and Ivar Jepson, Oak Park, Ill., assignors to Sunbeam Corporation, Chicago, Ill., a corporation of Illinois Application January 31, 1951, Serial No. 208,709

8 Claims. (Cl. 259—84)

The present invention relates to food mixers and more particularly to power driven food mixers generally referred to as home food mixers. Specifically, the present invention is a continuation-in-part of copending Graham and Jepson application, Serial No. 739,634, filed April 5, 1947, now abandoned.

In home food mixers, it has been common practice to provide means whereby relative movement between the position of the beaters and the position of the mixing bowl can be accomplished. This is necessary with mixers which generally include two mixing bowls, one a large mixing bowl and the other a small mixing bowl, for, obviously, with different sized mixing bowls, the position of the beater relative to the bowl support must be different for optimum mixing operation. Moreover, it is common practice in such household mixers to provide so called attachments whereby the mixer motor may be used to drive other apparatus such as food grinders, cabbage shredders and the like. Such apparatus usually requires a predetermined relationship between the power take off mechanism, which in some cases comprises one of the beater sockets, and the base from which the mixing bowl is supported. It is furthermore frequently desirable during the mixing of batters, beverages and the like to change the position of the beaters relative to the bowl so as to insure a thorough intermixing of all the contents of the mixing bowl. Preferably, of course, it is desirable to be able to effect such a change of position of the beaters relative to the bowl without the necessity of stopping the mixer. There are mixing operations in which it is necessary continuously to move the beaters back and forth through the mixer to insure the proper intermixing of the ingredients.

While many previous designs of mixers have permitted relative movement between the beaters and the mixing bowl, they have not been wholly satisfactory in service. For example, in some instances the position of the turntable supporting the mixing bowl is changed by bodily movement thereof from one positon to another. It is obviously necessary to stop the mixer in order to make such change in position of the turntable and in the case of the busy housewife, this results in a loss of time. In other instances a lever has been directly secured to the upright supporting the motor and beaters to shift the upright relative to the bowl support. In still another instance the lever has been secured directly to the turntable to shift the turntable and consequently the bowl supported thereon relative to the beaters. Whether the construction includes a lever directly attached to the turntable or the upright, adjustment cannot always be made in a satisfactory manner. This is because the whirling beaters within the material being mixed resist movement through the mixture in the bowl whereby the leverage or force which can be applied is not sufficient to move the beaters through the mixture. Where movement of the beaters through the mixture is possible, it is usually jerky so that satisfactory results are not obtained.

In mixer constructions heretofore employed, the overall height of the device has been relatively great due to the fact that a certain minimum clearance is necessary between the bowls and beaters and the turntable support generally requires a predetermined space. It would be desirable to provide an improved arrangement whereby the overall height of the mixer is reduced to a minimum so as to be able to be disposed in a low overall vertical space.

It is an object of the present invention to provide an improved home food mixer having the desirable features and characteristics enumerated above.

It is another object of the present invention to provide in a home food mixer a mechanism for positively adjusting the beaters relative to the bowl which has a mechanical advantage so that even under extreme service conditions, such adjustment can be made in a quick, smooth and even manner.

It is another object of the present invention to provide a mechanism in a food mixer having provision for accurately locating the beaters when they are shifted to extreme positions so as to be usable with mixing bowls of different sizes while being accurately aligned with respect thereto.

Still a further object of the present invention resides in the provision of an improved mixer construction in which accurate location of the relative position of the driving mechanism and the mixer base is provided not only to insure accurate positioning of the beaters relative to the bowl, but whereby the device will properly coact with an appliance in the nature of an attachment to the base.

Still another object of the present invention resides in the provision of an improved household food mixer having a novel base construction designed to permit low overall height of the mixer while at the same time providing a construction which is sturdy and which is designed from the standpoint of preventing extraneous material to enter into places difficult to be cleaned.

A still further object of the present invention resides in the provision of an improved home food mixer which is simple in construtcion, inexpensive to manufacture, and which will give long years of fool-proof service.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

Fig. 3 is an enlarged sectional view taken substantially on line 3—3 of Fig. 1 showing details of the force multiplying means and with the control lever in an intermediate position;

Fig. 4 is a transverse sectional view taken substantially along line 4—4 of Fig. 3 assuming that Fig. 3 shows the complete structure;

Fig. 5 is a bottom view of the lever and lever locking mechanism of Fig. 4;

Fig. 6 is a sectional view taken substantially along the section line 6—6 of Fig. 5;

Fig. 7 is an elevational view similar to Fig. 1 with portions thereof broken away, illustrating another embodiment of the present invention with the parts in the same position of Fig. 1;

Fig. 8 is a sectional view taken substantially along line 8—8 of Fig. 7 but with the beater positions shown as in Fig. 2 of the drawings;

Fig. 9 is an enlarged fragmentary view of the modification shown in Fig. 7 corresponding to the representation of Fig. 3.

Fig. 10 is a sectional view taken on line 10—10 of Fig. 9 assuming that Fig. 9 shows the complete structure but actually showing slightly more of the base than is shown in Fig. 9.

Fig. 11 is a bottom fragmentary view of Fig. 7 somewhat similar to Fig. 5, but with the lever in one extreme position; and Fig. 12 is a sectional view taken substantially along line 12—12 of Fig. 11.

Figures 1, 2:
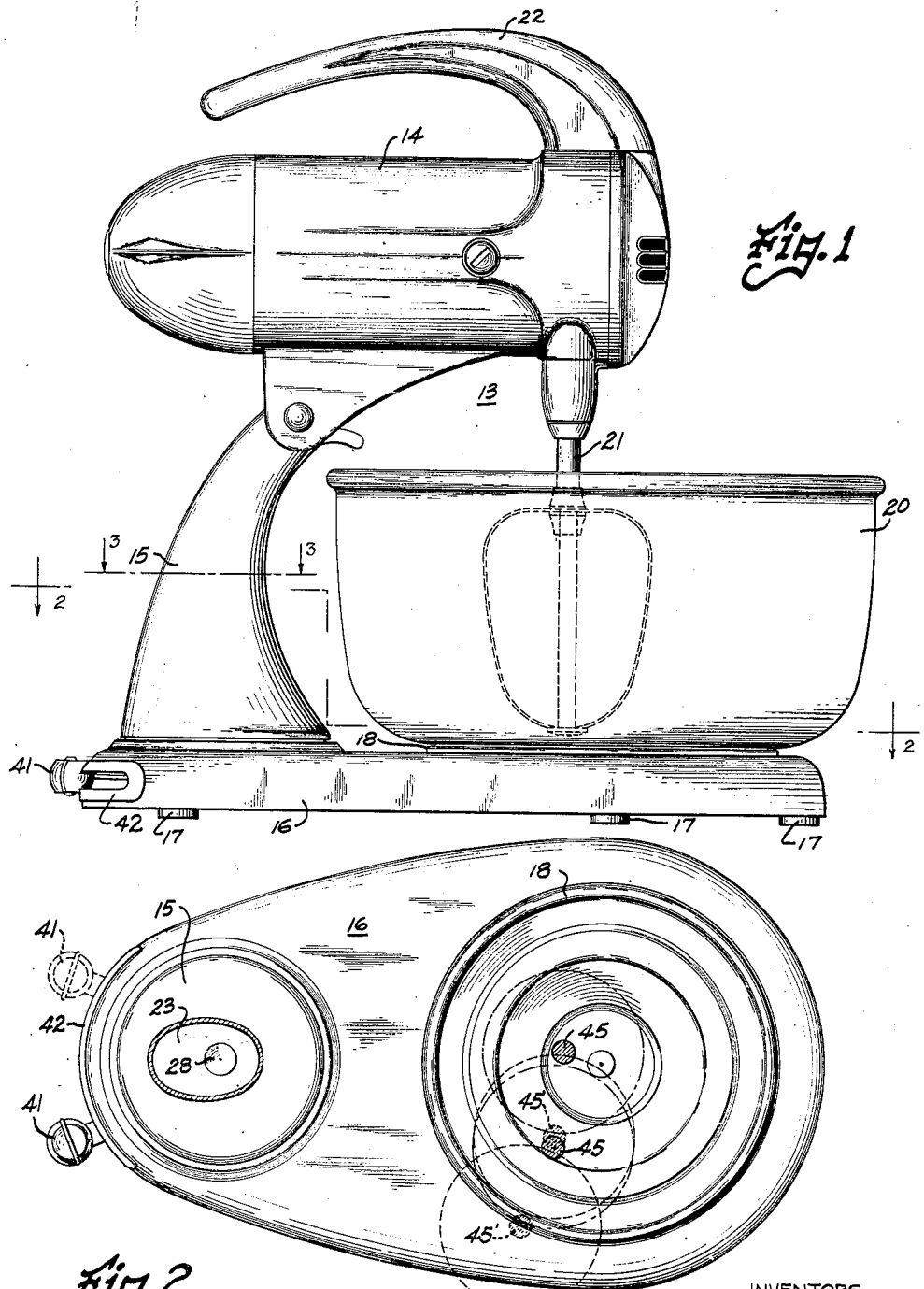
Fig. 1 is a side elevational view of a home food mixer comprising a preferred embodiment of the present invention with the bowl and beaters in one extreme predetermined relative position.
Fig. 2 is a transverse sectional view taken substantially along the section line 2—2 of Fig. 1 but with the bowl and beaters shown in solid lines in the other extreme position, and by dotted lines in said one extreme position.

The present invention is primarily concerned with an improved arrangement for shifting the vertical support for the motor and beaters relative to a base upon which a rotatable bowl support is disposed in fixed position. The shifting mechanism embodies improved features whereby a substantial motion reduction and force multiplication device is provided to insure proper movement regardless of the force opposing such movement. The improved arrangement also includes means for providing a low overall height of the mixer by virtue of providing a base with a substantial depression therein for receiving and supporting the turntable for the mixing bowl in a comparatively low position since this turntable need not be removed when different sized mixing bowls are employed. It can be set in such low position and arranged to prevent the entrance of extraneous material such as food or the like within the recess or depression.

Referring now to Figs. 1 to 6 of the drawings, there is illustrated an electric food mixer generally indicated by the reference numeral 13 which is commonly designated as a home food mixer. It comprises the conventional motor and gear housing 14 detachably and pivotally mounted to a more or less vertical support, upright or standard 15 which in turn is rotatably supported from one end of a suitable base 16, the latter being provided with legs 17 of suitable material to cushion and firmly support the base 16 from any surface on which it may be disposed. The base 16 supports at the opposite end thereof a suitable rotatable platform or mixing bowl turntable 18 which is preferably disposed within a recess 19 defined within the base 16. As is best shown in Fig. 4 of the drawings, the base is preferably constructed as a sheet metal stamping and the recess 19 is formed by the stamping operation to receive therein the turntable 18 which extends only very slightly above the surface of the base 16.

Supported for rotation with the turntable 18 are conventional mixing bowls such as 20 shown in Fig. 1 of the drawings. The mixing bowl 20 is what is commonly termed the large mixing bowl and conventionally such a home food mixer is also supplied with a small size mixing bowl whereby the proper size may be selected depending upon the particular mixing operation to be performed. Conventionally, the mixer 13 furthermore comprises a pair of spaced beater elements 21 only one of which is visible in the drawings. These beater elements and the bowl arrangement are preferably such as disclosed and claimed in Patent No. 2,615,690, granted October 28, 1952, and assigned to the same assignee as the present application. The mixer 13 furthermore includes a suitable handle 22 which preferably actuates suitable beater ejector means in response to tilting or pivotal movement of the handle 22. It will be apparent that when the beaters 21 are rotating within any mixing bowls such as 20 disposed on the turntable 18, ingredients contained within the mixing bowl will be agitated and aerated. Preferably one of the beater elements is provided with means for causing simultaneous rotation of the mixing bowl in a manner disclosed and claimed in copending Jepson application Serial No. 28,019, filed December 19, 1948, now Patent Number 2,552,972.

It will be apparent that in utilizing different sized bowls on the turntable 18, the relative position of a particular bowl such as 20 with respect to the beaters 21 must be adjusted or positioned to insure a thorough mixing. Preferably the beaters are arranged so that one beater element operates closely adjacent the wall of the mixing bowl and when different sized mixing bowls are employed, quite obviously the relative position of the beaters and bowl must be changed. It is, of course, desirable to be able to make this adjustment quickly, smoothly and evenly when the mixer is stopped or during the mixing operation and the present invention is concerned with improved means whereby either a fixed or continuous adjustment of the beaters relative to the bowl may be effected under all service conditions. To this end, the invention contemplates a force multiplying mechanism, having a mechanical advantage substantially greater than one, disposed between the upright 15 and the base 16 and arranged so that a relatively large movement of the lever or force multiplying mechanism effects only a small, but powerful rotational movement of the upright 15 so as positively to vary the position of the beaters under the most severe mixing conditions in accordance with the desires of the operator.

In order to produce relative pivotal movement of the upright 15 with respect to the base 16, there is contemplated in accordance with the present invention a gear mechanism, an eccentric mechanism, a cam mechanism or the like. As specifically illustrated, there is provided a gear mechanism including a disc 23 attached by suitable screws or fastening means 24 to the bottom of the upright 15. In order to maintain the weight of the mixer at a minimum and still provide ample strength, the upright 15 is of relatively thin-walled material, but is provided with integral lugs 15a extending inwardly of the hollow upright 15 for receiving therein the fastening means or screws 24. In this way, the bottom of the upright is effectively closed with the disc 23. In accordance with the present invention, the disc 23 acts as a driven segmental internal annular gear fixedly attached to the upright 15 thereby to cause the latter to rotate about a fixed axis. To accomplish this, the disc 23 is provided with an opening 26 having defined along the edges of one side thereof gear teeth 27 effectively arranged along a circle which if continuous would provide an internal annular gear. However, since only a relatively small pivotal movement of the upright 15 is required only a relatively short annular gear portion is necessary. Moreover, the gear teeth 27 are formed along an arc having as a center, the bolt 28 which forms the pivotal axis of the upright 15. This center bolt 28 extends through the disc 23 concentrically with respect to the gear segment 27 and attaches the upright to the base 16 for pivotal movement with respect thereto. In accordance with the present invention, the base 16 includes a shallow dished portion 16' beneath the center or pivotal axis of the upright 15, and the bolt 28 extends through aligned openings in the disc 23 and the dished portion 16'. A suitable washer 30 and nut 31 are applied to the center bolt 28 pivotally to relate the disc 23 with the base 16. The center bolt 28 is preferably provided with a shoulder 26' about which the disc 23 pivots. If desired, a suitable lock nut or similar element 32 may be associated with the center bolt 28. It will be apparent that rotative movement of the gear segment 27 and consequent rotative movement of the disc 23 fixedly attached to the upright 15 will move the beater support and consequently the beaters along a circle having as its axis the center bolt 28. It will also be apparent that by virtue of the dished configuration of the base at the portion 16' greater rigidity of the base portion is provided although, if desired, a suitable reinforcing plate such as is shown in the modification of Figs. 7 to 12 of the drawings may be employed.

For the purpose of causing rotatable movement or limited pivotal movement of the upright 15 about the axis or center bolt 28, there is provided a manual control lever 35 preferably comprising a stamping of a stepped configuration best shown in Fig. 4 of the drawings. This manually actuable lever 35 has an elongated lever portion 35a arranged to be disposed in a horizontal plane and a short vertical portion 35b connecting the elongated horizontal portion 35a with a short horizontal portion 35c pivotally mounted as by a suitable rivet 37 to the base 16.

The lever 35 is furthermore provided with an additional horizontal extension 35d connected to the portion 35c by a short vertical section 35e. The end of the extension 35d has gear teeth 38 formed thereon for meshing with the gear portion 27 of the disc 23. The gear teeth are preferably formed during the stamping operation of the lever 35. From the arrangement described, it will be apparent that the manually actuable lever 35 has a very short lever arm between the pivot 37 and the gear teeth 38 and a relatively long lever arm between the pivot 37 and the other end of the manually actuable lever 35. Preferably, this last mentioned end of the lever member 35 protrudes through a suitable opening 40 defined in the base 16 at the opposite side of the upright 15 from the side adjacent which the beater elements 21 extend. Moreover, this end of the lever arm 35 is provided with a suitable control knob 41. The opening 40 essentially comprises an elongated slot extending through a substantial angle in view of the fact that with the force multiplying arrangement, there is a considerable motion reduction. Preferably the opening 40 is effectively lined with a rubber or plastic bezel 42 formed on an arc concentric with the pivot 37 and consequently the adjacent portion of the base 16 is formed on this same arc. This bezel will prevent metal to metal contact, thus eliminating any rattling should there be any vibration of the lever member 35. It will be apparent that when the control knob 41 is actuated to swing the lever 35 between the solid and dotted line positions shown in Fig. 2 of the drawings, that a reduced pivotal motion of the gear teeth 38 about the pivot 37 occurs, and a similar motion of the upright 15 driven thereby about axis 26 also occurs. The positions of the shafts of the beaters 21 in the solid line position of the manual control button 41 are represented by the reference numeral 45 in Fig. 2 of the drawings, while the positions of these beater shafts in the dotted line position of the lever 41 are shown by the reference numeral 45'. These are effectively the extreme counterclockwise and clockwise positions, respectively, of the upright 15. With the force multiplying mechanism of the present invention movement of the lever 35 through an angle of 75 degrees effects an angular movement of the beaters of the order of 15 degrees. Thus, there is provided a mechanical advantage of five to one.

For the purpose of accurately positioning the manual control button 41 in the two positions shown which are assumed to be the positions of the beaters when the small and large mixing bowls are employed respectively to insure optimum mixing operation, there are provided locking means for the lever 35 specifically designated as 47 and 48 best shown in Figs. 5 and 6 of the drawings. Except for the fact that one of these locking means is right-handed while the other is left-handed, they are otherwise identical in construction and each comprises a notch 49 bounded on the side of maximum motion of the lever 35 by a stop shoulder 50. The elements 47 and 48 are of arcuate configuration and are provided with a lateral tab portion or flange 51 having an arcuate opening 52 therein for receiving suitable screw or fastening means 53 whereby the stop means 47 and 48 may be attached to the base 16. The portions of the stop members 47 and 48 intermediate the notches 49 provide a sort of cut-away portion whereby it is possible to move the lever 35 back and forth while the mixing operation is going on. When the large bowl is used, the lever 35 may be moved into the notch 49 of the stop member 47 and when the small bowl is employed, the lever 35 will be moved into the notch 49 of the stop member 48 thereby insuring the accurate relationship between the beaters and bowl as fully described and claimed in the above mentioned copending Jepson application. The lever 35 is moreover preferably formed of springlike material so that it is inherently biased in an upward direction for engagement with the notches 49 and it is necessary to depress the button 41 to release it from the notches 49 when pivotal movement of the standard 15 and swinging movement of the beaters 21 relative to the base 16 is desired. Moreover, by means of this construction, the operating location of the beaters at the two opposite limits may be accurately determined whereby the outermost beater is in the desired operating relation to the inner wall of the mixing bowl for either a small or large bowl. In one of these two positions, moreover, the mechanism may be so arranged as to permit accurate aligning of the beater driving unit with an appliance (not shown) which is designed to be attached to the mixer in the manner of Patent 1,975,949, granted October 9, 1934 and also assigned to the same assignee as the present application. Such an appliance is applied to the base after the turntable 18 is removed. The appliance is usually provided with locating lugs which fit into one or more suitable openings defined in the base, one of which may be the socket for the rotatable turntable 18. In this location of the appliance, the shaft by which the appliance is driven must fit into driving connection with one of the spindles of the motor unit 14 and thus the present invention also provides means for accurately locating one of the beater sockets or motor spindles with relation to the base of the mixer and consequently with relation to an appliance which may be mounted in a predetermined position on the base. It will be understood that the stop means 47 and 48 instead of being provided with only two notches 49 at the extreme positions thereof, might be provided with a plurality of intermediate notches, and such an arrangement is disclosed in Figs. 7 to 12 of the drawings described hereinafter.

In view of the detailed description included above, it will be apparent that there has been provided a strong and sturdy base construction designed to provide low overall height of the mixer. The base is essentially of one piece construction and as mentioned above preferably a stamping or die casting or the like. By making the base 16 out of the stamping with the turntable recess 19, it is possible, of course, to mount the turntable in a suitably lower position than was heretofore possible where the turntable had to assume several positions relative to the base, thus giving an overall low position of the cooperating mixer parts. The recess 19, like the deformation 16', serves to reinforce the base against twisting and distortion strains. Preferably, the turntable 18 is provided with a downturned rim 18' best shown in Figs. 7 and 10 of the drawings described hereinafter which fits within the recess 19 and serves to prevent the entrance of extraneous material. With this type of base construction, moreover, it is clear that there is provided a hollow portion beneath the standard 15 of considerable volume for housing the above described mechanism by means of which the upright 15 is mounted and shifted. Thus, the provision of this rather deep base not only serves to house the described mechanism, but promotes a low overall height of the mixer and provides a strong and sturdy base for the type of movement herein contemplated.

With the present invention, the relatively large arc of movement of the shifting lever 35 as compared with the resultant angular shifting of the beater driving unit makes for smooth and easy operation when setting the beater driving unit in any desired position. This construction, moreover, provides a firm and sturdy mounting for the beater driving unit so as to avoid any looseness or displacement from a set operating position.

Referring now to Figs. 7 to 12 of the drawings, there is illustrated a mixer generally designated at 60 which is substantially identical with the arrangements described above, except for the details of the beater shifting mechanism. Accordingly, the corresponding parts of Figs. 7 to 12 are designated by the same reference numerals as in the preceding figures. As in the preceding embodiment, there is provided a disc 61 fixed to the upright 15 by screws 24 in the same manner as the disc 23 was attached in the preceding embodiment. The disc 61, moreover, is in the form of a segmental internal annular gear specifically designated by gear teeth 62 defined along the edges of an elongated opening 63 in the disc 61. The central portion of the disc 61 is raised with respect to its marginal portion so as to provide a flat annular bearing surface 64 which seats on a washer 65 which in turn seats on the top surface of the base 66. A center bolt 67 suitably fixed to the disc 61 concentric with the gear teeth segment 62 is mounted for pivotal movement on the base and serves to retain the beater support or upright 15 in position on the base. To provide increased rigidity for the base 66, there preferably is provided a reinforcing plate 68 brazed or welded to the underside of the base 66. The center bolt 67 is secured in position by means of nuts 70 which hold the headed end of this bolt down against the disc or gear plate 61. Metal and plastic washers 71 and 72, respectively, interposed between the reinforcing plate 68 and the upper nut 70 provide a suitable friction surface between these parts. This friction bearing together with the friction bearing between the marginal seat 64 and the washer 65 provide for smooth movement of the support 15 on the base 66, when the lock nuts 70 are applied. This construction insures a firm mounting and attachment on the support and on the base and at the same time permits easy movement of the support. Moreover, it is advantageous from the standpoint of assembling and disassembling the parts.

For the purpose of driving the segmental gear comprising the gear teeth 62, there is provided a segmental pinion 74 rigidly attached to the upper end of a vertical shaft 75 which is supported for rotative movement in a sleeve 76 fixed to the base 66. Preferably the sleeve 76 is press fitted in the reinforcing plate 68 and is brazed or welded thereto. The shaft 75 with the segmental pinion 74 attached thereto is inserted from the top of the base before the upright 15 is fastened to the base 66 by the center bolt 67. Moreover, the shaft 75 extends beneath the sleeve 76 and is retained against upward displacement by means of a split retaining ring 77 disposed in a suitable annular recess defined in the shaft 75. Downward movement of the shaft 75 is, of course, prevented by the segmental pinion 74.

For the purpose of causing pivotal movement of the segmental pinion 74, there is provided a manually actuable operating or shifting lever 79 which has one end thereof fixed to the lower end of the shaft 75 as by a screw 80. The other end of the lever 79 protrudes through the arcuate opening in the base 66 identical with the opening 40 described in the preceding embodiment which opening is preferably lined by a similar bezel 42. The opening 40 formed in the base 66 is preferably formed on an arc concentric with the shaft 75. A suitable knob or handle 41 as in the preceding embodiment is fixed to the outer end of the lever 79 and is operable to oscillate the pinion 74 and thereby rotatively move the upright or support 15 about the vertical axis of the center bolt 67 to shift the beaters laterally to different operating positions.

For the purpose of accurately positioning and locking the beaters with respect to the mixing bowl disposed on the turntable 18, there are provided a pair of notched segments 83 and 84 attached to a supporting member 85 which in turn is fixed by the brazing or welding to the reinforcing plate 68. The supporting member 85 is of arcuate configuration as best shown in Fig. 11 of the drawings and is provided with a pair of threaded openings for receiving fastening screws 86. Each of the notched segments 83 and 84 is of arcuate configuration and is provided with the elongated slots 89 to receive the fastening means 86 and permit lengthwise adjustment of the segments 83 and 84 relative to the support 85. Each of the segments 83 and 84 is provided with a series of serrations or notches 90 on its lower edge adapted to be engaged by a projection 79a of the lever 79. The lever 79 is preferably of spring material biased so as to maintain its seating in engagement with any one of the notches 90. In order positively to locate the extreme positions of the beaters for use with a large and small mixing bowl as described above or with an associated appliance each of the segments 83 and 84 is provided on its remote end with a stop extension 92 positively to limit the extreme movement of lever 79 thereby accurately determining the opposite limits of the beater locations such as the extreme clockwise or counterclockwise position.

It will be observed that as a result of this construction, the beaters may be located in a precise manner with respect to the mixing bowls and the base at two extreme operating positions as shown in Fig. 8 of the drawings. The beater at the outermost position is shown by dotted lines 95 in Fig. 8 of the drawings and at the innermost position by the dash and dot lines 96, the former operating relation being controlled by the position of the notched segment 84 and the latter by the notched segment 83 both in cooperation with the lever 79. In the position 95 shown in Fig. 8 of the drawings, the object is to locate the outermost beater in the desired operating relation to the inner wall of the large mixing bowl. In the opposite position 96, the beaters are located in the desired operating relation with respect to the inner wall of the small mixing bowl and also with an appliance suitably associated with the base as described above. Preferably, the base is provided with openings 97 and 98, the former opening receiving the pivotal support 99 of the turntable 18. These openings 97 and 98 with the turntable 18 removed accurately locate a suitable appliance with respect to the base. For any intermediate position of the beaters, the notches 90 may be employed to hold the lever 79 in position.

While there has been illustrated and described several embodiments of the present invention, it should be understood by those skilled in the art that the present invention is not limited to the specific details and construction thereof illustrated, and it is intended in the appended claims to cover all such changes and modifications as fall within the true spirit and scope of the present invention.

What is claimed as new and desired to be secured by Letters Patent of the United States is:

1. In a food mixer, the combination of a base, a turntable mounted on said base and shaped to support a mixing bowl, a mixing bowl supported by said turntable, an upright rotatably supported on said base to turn about a vertical axis, a beater supported on the upright and disposed to be received in said bowl, a disk having a gear formed thereon and secured to said upright with the gear concentric with respect to said axis, a shaft rotatably mounted on said base to turn about an axis eccentric with respect to the first mentioned axis, a gear rigidly affixed on one end of said shaft and disposed to mesh with the gear on said disk, a lever rigidly secured to the opposite end of said shaft and arranged to be accessible from the exterior of the base, said gears and lever being so arranged that a large adjustment of the lever effects a small powerful movement of the upright whereby to positively shift the beaters relative to the bowl.

2. In a food mixer, the combination of a mixing bowl, a base including means for supporting said mixing bowl on said base, an upright mounted on said base for pivotal movement about a vertical axis, beater means depending from said upright and disposed to extend into said mixing bowl, a disk having a gear portion formed thereon and secured to said upright with said gear portion concentric with respect to said axis, means for producing limited pivotal movement of said upright to cause said beater to assume different positions in said mixing bowl comprising a lever, means for pivotally supporting said lever from said base, said lever being accessible from the exterior of said base, said lever comprising a stamping including gear teeth defined at one end, said gear teeth on the end of said lever being drivingly engaged by said gear portion whereby pivotal movement of said lever causes limited rotational movement of said upright.

3. In a household food mixer, the combination including a base, a mixing bowl supported near one end of said base, an upright supported at the other end of said base, means for supporting said upright for pivotal movement relative to said base, a power unit supported by said upright, a beater driven by said power unit and depending into said bowl, a plate having its center disposed on the pivotal axis of said upright, means for fastening said plate to the underside of said base, an arm having its longitudinal axis generally parallel with said plate, and disposed adjacent one face of said plate, means for supporting said arm for pivotal movement relative to said plate, motion transmitting means interconnecting the pivotally mounted upright and the pivotally mounted arm whereby motion of said arm and said upright occur simultaneously, and stop means extending from the face of said plate adjacent said arm engageable respectively with opposite sides of said arm to limit respectively the maximum clockwise and counterclockwise pivotal movement of said upright.

4. The combination set forth in claim 3 in which the position of said stop means is adjustable relative to said base.

5. The combination set forth in claim 3 in which said stop means comprise two stop elements each independently adjustable relative to said base.

6. In a household food mixer, the combination including a base, a mixing bowl supported near one end of said base, an upright supported at the other end of said base, a power unit supported from said upright, a beater supported from and driven by said power unit depending into said bowl, means for supporting said upright for pivotal movement relative to said base, a plate of generally circular configuration fastened to the underside of said base with its transverse axis coincident with the pivotal axis of said upright, an arm, means for pivotally supporting said arm beneath said plate for pivotal movement relative to said plate, motion transmitting means interconnecting said upright and said arm whereby pivotal movement of said upright and said arm occur simultaneously, and stop means depending from said plate and engageable with said arm for limiting the maximum clockwise and counterclockwise movement of said arm and upright.

7. In a household food mixer, the combination including a base, a mixing bowl supported near one end of said base, an upright supported at the other end of said base, a power unit supported from said upright, a beater supported from and driven by said power unit depending into said bowl, means for supporting said upright for pivotal movement relative to said base, a plate of generally circular configuration fastened to the underside of said base with its transverse axis coincident with the pivotal axis of said upright, an arm, means for pivotally supporting said arm beneath said plate for pivotal movement relative to said plate, said arm being resilient and inherently biased toward said plate, motion transmitting means interconnecting said upright and said arm whereby pivotal movement of said upright and said arm occur simultaneously, stop means depending from said plate and engageable with said arm for limiting the maximum clockwise and counterclockwise movement of said arm and upright, and cooperating means supported by said plate utilizing the inherent resilience of said arm for releasably locking said arm in its two extreme positions in engagement with said stop means.

8. In a food mixer, the combination of a base, said base being adapted to support one or more elements thereon, an upright rotatably mounted on said base for pivotal movement about a first vertical axis, a power unit supported on said upright and extending over at least a portion of said base, driven means supported by said power unit so as to extend toward said base and connected thereto for rotation about a second vertical axis, means defining a recess in said base adapted fixedly to locate one of said elements on said base, a shifting device for pivoting said power unit about said first vertical axis and shifting said driven means laterally with respect to said recess, said shifting device including an internal gear concentric with said first vertical axis and means for adjusting said shifting device accurately to position said driven means relative to said recess comprising a manually operable lever and motion reducing means including a gear portion operable between said lever and said gear of said shifting device for adjusting the latter by operation of said lever.

BERNARD ALTON GRAHAM.
IVAR JEPSON.

References Cited in the file of this patent

UNITED STATES PATENTS

| Number | Name | Date |
|---|---|---|
| 303,264 | Cardwell | Aug. 12, 1884 |
| 1,200,392 | Neller | Oct. 3, 1916 |
| 1,300,619 | Johnson | Apr. 15, 1927 |
| 2,038,256 | Wright | Apr. 2, 1936 |
| 2,056,512 | Fitzgerald | Oct. 6, 1936 |
| 2,069,506 | Ross | Feb. 2, 1937 |
| 2,512,068 | Mayo | June 20, 1950 |

FOREIGN PATENTS

| Number | Country | Date |
|---|---|---|
| 277,511 | Great Britain | Sept. 22, 1927 |
| 617,028 | Great Britain | Jan. 31, 1949 |